(12) United States Patent
Brush et al.

(10) Patent No.: US 11,218,565 B2
(45) Date of Patent: Jan. 4, 2022

(54) PERSONALIZED UPDATES UPON INVOCATION OF A SERVICE

(71) Applicant: Microsoft Technology Licensing, LLC, Redmond, WA (US)

(72) Inventors: Alice Jane Bernheim Brush, Bellevue, WA (US); Lisa Stifelman, Palo Alto, CA (US); James Francis Gilsinan, IV, Redmond, WA (US); Karl Rolando Henderson, Jr., Renton, WA (US); Robert Juan Miller, Bellevue, WA (US); Nikhil Rajkumar Jain, Bellevue, WA (US); Hanjiang Zhou, Bothell, WA (US); Oliver Scholz, Seattle, WA (US); Hisami Suzuki, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/661,787

(22) Filed: Oct. 23, 2019

(65) Prior Publication Data

US 2021/0126985 A1 Apr. 29, 2021

(51) Int. Cl.
*H04L 29/08* (2006.01)

(52) U.S. Cl.
CPC ............ *H04L 67/32* (2013.01); *H04L 67/306* (2013.01)

(58) Field of Classification Search
CPC .............................. H04L 67/32; H04L 67/306
See application file for complete search history.

(56) References Cited

U.S. PATENT DOCUMENTS

| | | | |
|---|---|---|---|
| 10,671,343 B1* | 6/2020 | Kim | G06F 3/167 |
| 2014/0244712 A1 | 8/2014 | Walters et al. | |
| 2015/0088514 A1* | 3/2015 | Typrin | G06F 3/167 |
| | | | 704/249 |
| 2018/0366118 A1 | 12/2018 | Lovitt et al. | |
| 2019/0013019 A1 | 1/2019 | Lawrence | |
| 2019/0074013 A1 | 3/2019 | Lawrence | |

OTHER PUBLICATIONS

"International Search Report and Written Opinion Issued in PCT Application No. PCT/US20/055183", dated Jan. 22, 2021, 12 Pages.

* cited by examiner

*Primary Examiner* — Kim T Nguyen
(74) *Attorney, Agent, or Firm* — Liang IP, PLLC

(57) ABSTRACT

A primary virtual assistant and local virtual assistant herein can provide secondary information, including, without limitation, user-specific information, without having direct access to such information. For example, a user may invoke a secondary virtual assistant, through the local virtual assistant connected to a primary virtual assistant system. This invocation may be sent through the primary virtual assistant to the third party provider, i.e., the secondary virtual assistant. The secondary virtual assistant has access to the secondary information, for example, email, calendars, other types of information specifically associated with the user or learned from past user actions while this information is not directly available to the primary virtual assistant. This secondary information is then provided to the local virtual assistant in response to the invocation to be provided to the user.

20 Claims, 15 Drawing Sheets

Fig. 4A

| User Identification 404 | Wake Word/ Signal 402 | Command 403 |

Fig. 4B

| User Identification 404 | Invocation 406 |

Fig. 4C

| User Identification 404 | Invocation 406 |

400

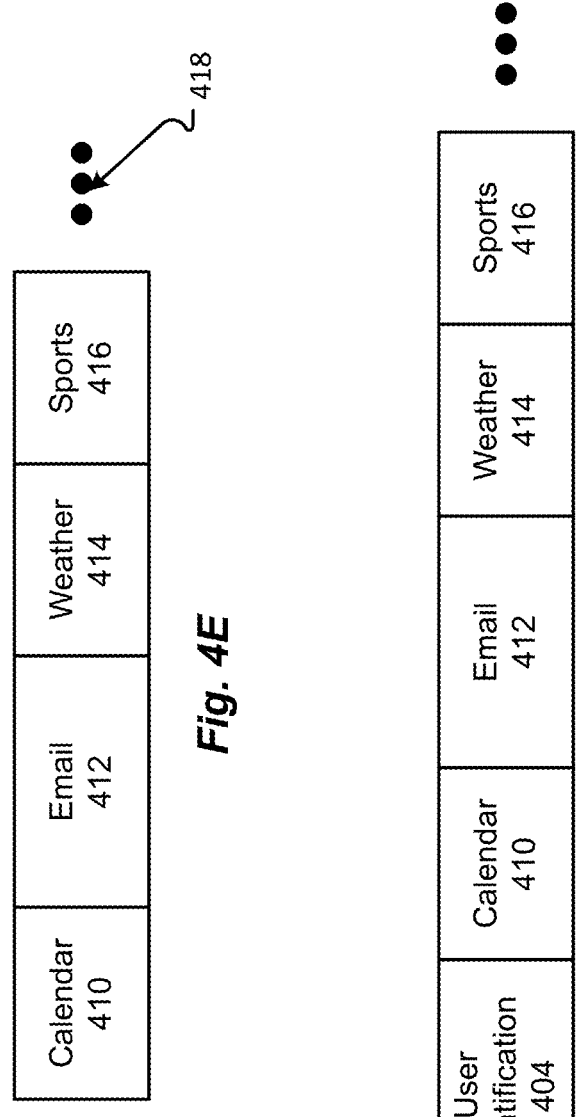

PERSONALIZED UPDATES UPON INVOCATION OF A SERVICE

BACKGROUND

Certain computer services, referred to herein as "virtual assistants," such as Amazon's "Alexa," Microsoft's "Cortana" or Apple's "Siri," have become extremely popular. In a common arrangement for a virtual assistant system, a user interacts with a local device by asking questions or issuing commands and getting responses in return from that device. In many situations, the local device is communicating with a more robust version of the virtual assistant operating on a server. In essence, the local device often uses or leverages the power and capability of the server-side service to provide responses to the user.

In practice, the virtual assistant system typically begins operation in response to a wake word uttered by the user to initiate communication with the local virtual assistant. The user may, either at the time of uttering the wake word or in a subsequent request, provide a command to engage the virtual assistant, such as a request for desired information (e.g., what is the weather report for today) or to have an action performed (e.g., play a particular song), to which the virtual assistant responds with the information or performs the task. As will be appreciated, sometimes the virtual assistant operating on the local device can process and service the requested command, while other times the command is sent from the local device to the server-side virtual assistant, often executing in the cloud. The server-side virtual assistant then services the request by locating the necessary information (or performing a suitable action) and provides an appropriate response back to the local, client-side virtual assistant. The local, client-side virtual assistant is then able to deliver the requested information or confirm that the requested task was performed (e.g., by delivering a response using text-to-speech techniques).

Unfortunately, under conventional techniques, virtual assistants, whether local or server-side, are limited in the type of information they can provide to a user or actions they can perform on the user's behalf. Each virtual assistant is programmed to access certain sources of information and/or perform particular actions, and cannot provide information or accomplish tasks outside of its framework. Indeed, users must specifically ask for the particular information desired from the virtual assistant and often the information is merely generic information (e.g., a weather forecast) provided in response to a web search. Moreover, the virtual assistant may not be privy to relevant information that the user would really like to know, nor does the virtual assistant proactively offer information to the user without requiring the user to specifically ask for it. It is with respect to these and other problems that embodiments of the present technology have been developed. It should be noted that the problems highlighted above are not the only issues/problems solved by embodiments discussed herein.

SUMMARY

In light of the above limitations of current services, among other considerations, aspects described herein relate to improving the information provided to a user by a virtual assistant. More specifically, the aspects relate to enabling a primary virtual assistant to leverage a secondary virtual assistant, e.g., one that may provide different information to a user than that accessible to the primary virtual assistant or which may accomplish different tasks on behalf of the user. In combination with the secondary virtual assistant, the primary virtual assistant provides more relevant information to the user, in some aspects without the user having to issue a specific request to retrieve such information. The information provided by the secondary virtual assistant is referred to herein as secondary information. In some aspects, secondary information may be user-specific information, such as information related to one or more user accounts associated with the user, but secondary information does not have to be limited to user information. In other aspects, secondary information may be data provided from other sources that are relevant to a user or to accomplish different tasks (e.g., via an Internet of Things (IoT) device) on behalf of a user or. Such secondary information may be managed by or accessible to the secondary virtual assistant but not the primary virtual assistant.

In an example, the user may, as discussed more fully below, explicitly request that the primary virtual assistant invoke a secondary service, e.g., a secondary virtual assistant. The secondary virtual assistant, upon the invocation, locates and retrieves secondary information relevant to the user. The secondary information may then be parsed, ordered, and filtered for provision back to the user. For example, secondary information that is evaluated to be more important and/or closer in temporal proximity to the current time may be prioritized. In a particular aspect, the secondary information may comprise important messages (e.g., emails) and/or calendar information (e.g., upcoming meetings or events). Indeed, the secondary information may change throughout the day and the user may periodically request updates from the secondary virtual assistant, through the primary virtual assistant.

As will be appreciated, the secondary virtual assistant may provide the secondary information to the primary virtual assistant in various forms, such as, raw data or a specific display or voice response for the primary virtual assistant to relay to the user. In turn, the local virtual assistant may then state, audibly play, or otherwise present the information (e.g., through a display) to the user.

In a particular example, personalized updates are provided to a user when the secondary virtual assistant is invoked. The user may "ask" the primary virtual assistant to "start" or invoke the secondary virtual assistant and in response, without more user interaction, the secondary virtual assistant provides timely or otherwise relevant items to the user, e.g., a reminder about a meeting that is about to begin or a notification of the receipt of an email from the user's supervisor. The secondary virtual assistant analyzes the secondary information available to it and determines which items to present to the user. Alternatively or additionally, the secondary virtual assistant provides other responses, such as the number of new emails received since the last inquiry or a full list of meetings scheduled for that day. Thus, in response to the invocation, the secondary virtual assistant, through the primary virtual assistant may provide relevant information that the primary virtual assistant would not otherwise be privy to. Many other potential examples exist and are discussed below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4A illustrates a data structure representing data or signals sent, retrieved, or stored by a virtual assistant in accordance with aspects of the present disclosure;

FIG. 4B illustrates another data structure representing data or signals sent, retrieved, or stored by a virtual assistant in accordance with aspects of the present disclosure;

FIG. 4C illustrates another data structure representing data or signals sent, retrieved, or stored by a virtual assistant in accordance with aspects of the present disclosure;

FIG. 4D illustrates another data structure representing data or signals sent, retrieved, or stored by a virtual assistant in accordance with aspects of the present disclosure;

FIG. 4E illustrates another data structure representing data or signals sent, retrieved, or stored by a virtual assistant in accordance with aspects of the present disclosure;

FIG. 4F illustrates another data structure representing data or signals sent, retrieved, or stored by a virtual assistant in accordance with aspects of the present disclosure;

DETAILED DESCRIPTION

Embodiments of the present technology relate to enabling a primary virtual assistant to leverage a secondary virtual assistant. Advantageously, a secondary virtual assistant may be able to provide different information to a user than what is available to the primary virtual assistant. The secondary virtual assistant may also be able to accomplish different tasks on behalf of the user than the primary virtual assistant. The combination of the primary virtual assistant and the secondary virtual assistant provides more relevant information to the user, and in some aspects without the user having to issue a specific request to the secondary virtual assistant to retrieve such information. In some embodiments, the service provides user-specific information to a user that is timely or otherwise relevant at the time the service is invoked (e.g., a next calendar appointment, upcoming tasks, and/or new emails received). The user-specific information may be provided as a summary. Given that many people have a hard time keeping track of what's coming up next in their day, such summaries, sometimes referred to as "updates" or "personalized updates," may assist the user in remembering or focusing on important information.

Additionally, since users often interact with different virtual assistants, each of which may provide different information and/or accomplish different tasks, the secondary information may be stored and managed on a different system (associated with a different virtual assistant), such that a different virtual assistant need be employed to discover such secondary information (e.g., upcoming meetings). Consequently, contemplated aspects described herein relate to providing communication between different virtual assistants to provide the information. Systems described herein use a local virtual assistant to interface with the user, a primary server-side virtual assistant to provide support for the local virtual assistant, and a secondary server-side virtual assistant to provide other relevant information to the user via the primary server-side and/or local virtual assistant. In such a system, information stored and managed by different virtual assistants can be provided to a user. Present configurations can proactively provide quick and consolidated information from different sources, improving the user's experience.

Figure 1:
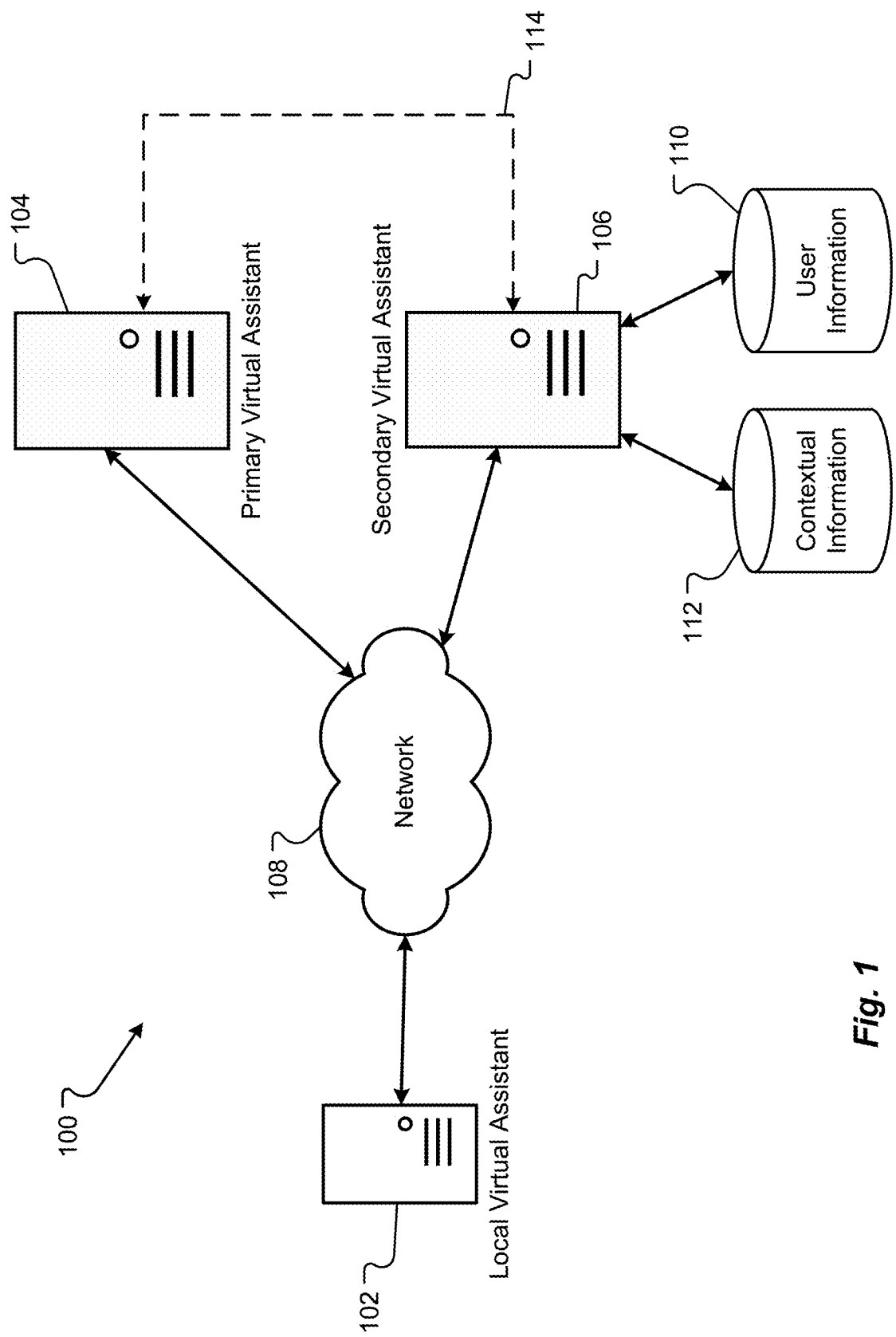
FIG. 1 illustrates an exemplary system incorporating aspects of the present disclosure.

Turning to the Figures, an exemplary system 100 for providing the user with secondary information is shown in FIG. 1. A local virtual assistant 102, which interfaces with a user (not shown), communicates with a primary virtual assistant 104 to provide various types of information and/or functions to the user. The primary virtual assistant 104 is in communication with a secondary virtual assistant 106, either directly or indirectly, and receives secondary information, including, but not limited to, user-specific information from the secondary virtual assistant 106 for transmission the user through local virtual assistant 102, in some cases via network 108.

For example, the primary virtual assistant 104 receives a command directing it to request services from a third-party service, for example, the secondary virtual assistant 106. Examples of the primary virtual assistant 104 may be Amazon's "Alexa®", Apple's "Siri®", Google's "Hey Google", Microsoft's "Cortana®", Samsung's "Bixby", etc. Examples of the secondary virtual assistant 106 may also be Amazon's "Alexa®", Apple's "Siri®", Google's "Hey Google", Microsoft's "Cortana®", Samsung's "Bixby", or any other type of virtual assistant or other application. To invoke the Cortana virtual assistant through the Alexa virtual assistant, a user may state: "Alexa, start Cortana." This command may be received by the primary virtual assistant 104 (in this case, Alexa) and be recognized as an invocation of the secondary virtual assistant 106 (in this case, Cortana). This invocation is then sent to the secondary virtual assistant 106 to invoke the secondary virtual assistant 106. In some aspects, and as discussed in more detail below, the invocation may not be explicit. For example, a user might state: "Alexa, get my email." The system is capable of understanding, as explained below, that Alexa doesn't have access to the user's email and needs to invoke Cortana to accomplish this task.

The local virtual assistant 102 operates on a local device, which can take many forms, for example, a smart speaker, smartphone, tablet computing device, smart television, or any other device with communication capabilities to send requests to a primary server-side virtual assistant and receive and relay responses to the user. The local virtual assistant 102 can include any hardware, software, or combination of hardware and software associated with a processor (and, for example, a connected speaker or display) as described herein in conjunction with FIGS. 10-13.

The primary virtual assistant 104 can be any hardware, software, or combination of hardware and software associated with any computing device, server, or computer as described herein in conjunction with FIGS. 10-13. In at least some configurations, the primary virtual assistant 104 is software executing on a server in or connected to an existing, known network 108, such as the Internet or what is often referred to as the cloud. In other configurations, as will be appreciated by those skilled in the art, the primary virtual assistant 104 may reside on the same device as the local virtual assistant 102. In such cases, the primary virtual assistant 104 may further provide the user interface capabilities described herein. While the present disclosure will primarily discuss those aspects where there is some separation between the primary virtual assistant 104 and the local virtual assistant 102, e.g., through network 108, the disclosure is not limited thereto.

The system 100 also includes a secondary virtual assistant 106. The secondary virtual assistant 106 can be any hardware, software, or combination of hardware and software associated with any computing device, server, or computer as described herein in conjunction with FIGS. 10-13. In at least some configurations, the secondary virtual assistant 106 is also software executing on a server in the cloud 108. The secondary virtual assistant 106 may be in communication with the primary virtual assistant 104 over the network 108 or it may communicate more directly, e.g., as indicated by the dashed line 114. The secondary virtual assistant 106 may be in communication with, have access to, and/or include one or more databases or data stores, for example, a user information data store 110 and/or a contextual information data store 112. As will be appreciated, in some configurations, the secondary virtual assistant 106, the primary virtual assistant 104, and/or the local virtual assistant 102 may operate all on the same device and need not communicate over the network 108. Further, in some configurations, the local virtual assistant 102 may communicate directly (not shown) with the secondary virtual assistant 106 without communicating through the primary virtual assistant 104.

In sum, one skilled in the art will appreciate that the local virtual assistant 102 and the primary virtual assistant 104 may be portions of the same virtual assistant, which executes on different devices, together on the same user device or on the same computing system in communication with the user, or in some other configuration. Thus, in at least some configurations, there are no communications between the local virtual assistant 102 and the primary virtual assistant 104 over a network 108, but the communications described hereinafter occur on the user device or another computing system. Further, the secondary virtual assistant 106 can also execute on the same or different device from the local virtual assistant 102 and/or the primary virtual assistant 104, which means the communications between the secondary virtual assistant 106 and the local virtual assistant 102 and/or the primary virtual assistant 104 may also not occur over the network 108.

The data stores 110 and 112 can include data or information that is associated with or relevant to the user of the local virtual assistant 102 but not accessible to the primary virtual assistant 104. The data stores 110 and 112 can store the information in any format, structure, etc. on a memory or data storage device, as described in conjunction with FIGS. 10-13. Generally, the user information in data store 110 includes information associated with one or more user accounts (e.g., email, calendar, tasks, and the like) that are specific to a user. The contextual information 112 can include information that is observed about the user, such as based on the user's interactions or patterns of behavior associated with the user accounts or otherwise. For example, the contextual information 112 may include interests of the user determined by observing interactions between the user and the secondary virtual assistant 106, or another system, for example, a search engine, on another computing device, etc.

The secondary virtual assistant 106 can retrieve the secondary (e.g., user-specific) information from one or more of the data stores 110 or 112. Then, the secondary virtual assistant 106 can evaluate the retrieved information and incorporate it into a response, for example, a textual or synthesized voice response, which can be sent to the primary virtual assistant 104. From the output received from the secondary virtual assistant 106, the primary virtual assistant 104 may provide the response to the local virtual assistant 102. This process for providing the response may be as described in conjunction with FIGS. 5-7. In some embodiments, the response includes secondary (e.g., user-specific) information that cannot otherwise be provided by the primary virtual assistant 104.

The network 108 through which the local virtual assistant 102, the primary virtual assistant 104 and the secondary virtual assistant 106 may communicate may be referred to as the cloud in some embodiments, but other network configurations are contemplated. The network 108 can be any type of local area network (LAN), wide area network (WAN), wireless LAN (WLAN), the Internet, etc. Communications between the virtual assistants 102, 104 and 106 can be conducted using any protocol or standard, for example, TCP/IP, JavaScript Object Notation (JSON), etc. Generally, commands or requests received at the local virtual assistant 102 are routed to the primary virtual assistant 104 for processing. However, it is contemplated that the secondary virtual assistant 106, in some embodiments, may be able to communicate directly with the local virtual assistant 102 and/or directly with the user through other means once invoked.

Figure 2:
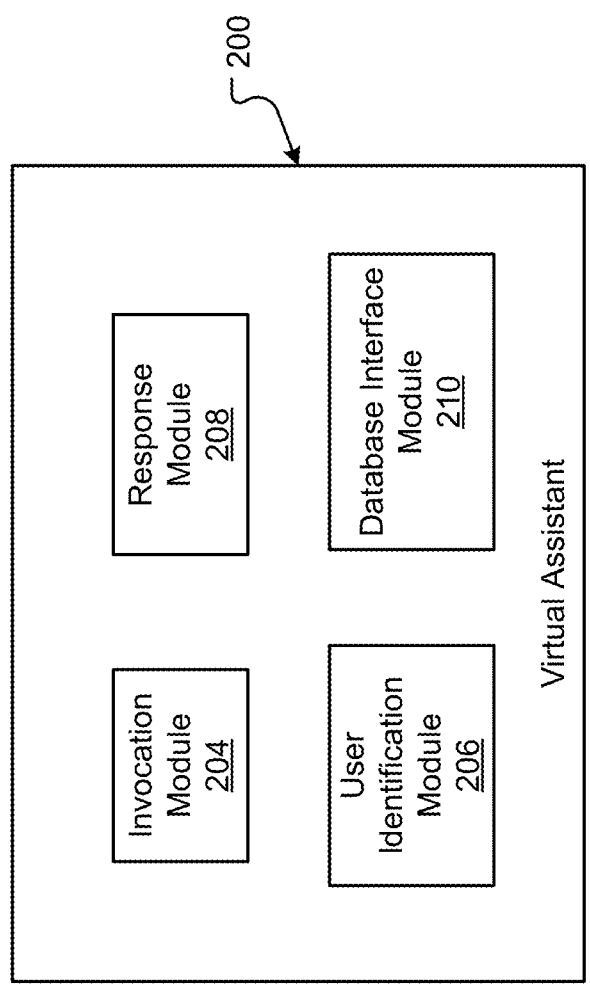
FIG. 2 illustrates a block diagram of an exemplary secondary virtual assistant in accordance with aspects of the present disclosure.

An example of a secondary virtual assistant 200 may be as described in conjunction with FIG. 2 wherein one or more components of the virtual assistant 200 are representatively shown. The virtual assistant 200 can include one or more of, but is not limited to, an invocation module 204, a user identification module 206, a response module 208, and/or a database interface module 210. These components 204, 206, 208 and 210 can be embodied in hardware and/or software, which may be executed by a processor, as described below in conjunction with FIGS. 10-13.

The invocation module 204 is configured to receive an invocation from another virtual assistant, such as primary virtual assistant 104, and respond to the invocation by providing secondary information. An invocation may occur based on a command received by the user, such as a command issued at the local virtual assistant 102 shown in FIG. 1. Upon receipt of the command at the local virtual assistant 102, the same or a related command is then sent to another virtual assistant, such as primary virtual assistant 104. Further, the related invocation command, when received by the primary virtual assistant 104, directs the primary virtual assistant 104 to request services from a third-party service, for example, the secondary virtual assistant 106. This command may be received by the primary virtual assistant 104 and be recognized as an invocation of the secondary virtual assistant 106. This invocation is then sent to the invocation module 204 of the secondary virtual assistant 106 to invoke the secondary virtual assistant 106.

The invocation module 204 can interface with an application programming interface (API) (not shown) and/or a communication interface (not shown) that receives messages from another virtual assistant over the network 108. The messages may be digitized communications produced by a speech recognition or other speech-to-text process of the primary virtual assistant 104. Alternatively or additionally, the messages may be a commands generated by another virtual assistant 104 based on speech recognition, a speech-to-text process and/or input from a user.

Messages received from another virtual assistant, e.g., from the primary virtual assistant 104 to the secondary virtual assistant 106, may be sent to the invocation module 204. In some embodiments, the invocation module 204 of the secondary virtual assistant 106 may determine if the message is an invocation. However, in other embodiments, the primary virtual assistant 104 can determine that the user input is an invocation and send the input information to the secondary virtual assistant 106 as a pre-determined invocation. Further, both the primary virtual assistant 104 and secondary virtual assistant 106 can jointly or in concert determine that a user input is an invocation. For example, each of the primary virtual assistant 104 and secondary virtual assistant 106 may vote on whether the input is an invocation and only upon a consensus is the input determined to be an invocation.

In embodiments, an invocation by the user may be required if the user has not interacted with the other virtual assistant, e.g., secondary virtual assistant 106, for a period of time (for example, 15 minutes), such that any previous session created with the user is terminated or timed out. In some embodiments, the invocation includes specific words or phrases to be identified as an invocation, for example, "Cortana start," "invoke Cortana," etc. If the specific words are received, then the invocation module 204 may recognize the message as an invocation. In other embodiments, the invocation may not reference a particular secondary assistant, but an invocation may be implied. For example, an invocation may be implied when a user requests information (e.g., calendar information) that is not accessible to the primary virtual assistant 104. In such cases, the primary virtual assistant may locate a secondary virtual assistant that can provide the requested information.

If an invocation has been received, the invocation module 204 can extract any user information included in the invocation and provide it to the user identification module 206. The user information may include, but is not limited to, the data as described hereinafter in conjunction with FIGS. 4A-4F. The user identification module 206 identifies the user based on the received information. For example, the user identification module 206 may use an internet protocol (IP) address to determine a person associated with the IP address of the local virtual assistant 102. Alternatively or additionally, the user identification module 206 may use voice recognition or other techniques to identify the user, such as when more than one user is associated with or in range of the local virtual assistant 102. Once an appropriate user has been identified, the associated user identity can be provided by the user identification module 206 to the database interface module 210.

The database interface module 210 is configured to extract secondary (e.g., user-specific) information associated with the identified user, e.g., from the data stores 110 and/or 112. The database interface module 210 may also order, filter, parse, or manage the secondary (e.g., user-specific) information as necessary. For example, secondary (e.g., user-specific) information with the closest temporal proximity to the current time, or events that will occur sooner than other events, may be ranked higher than information that is associated with a later time. In other circumstances, secondary (e.g., user-specific) information of a certain type may be ranked higher than other information, for example, emails may be ranked higher or lower than meetings, depending on user preferences or other ranking criteria. Beyond ranking, the secondary (e.g., user-specific) information may be filtered to eliminate or consolidate one or more items. Ultimately, all or a portion of the secondary (e.g., user-specific) information is provided to the response module 208 for delivery to the user.

The response module 208 is configured to compose the secondary (e.g., user-specific) information into a response that is delivered to another virtual assistant, such as the primary virtual assistant 104. The response can be many forms, for example, it can be a verbal response (generated from a text-to-speech process), another sound response, a text response, a visual response, a tactile response (e.g., for a visually impaired user), etc. Other words or phrases required for a complete and/or coherent response may be included with the user-specific information. For example, the response module 208 may use a variety of response templates to compose a reply, such as a message template that reads "Hi [user name], you have a new [type of message] from [message sender]." In some embodiments, the response is transformed from a textual message into an encoded voice response with a text-to-speech converter. The voice response may then be sent by the response module 208 to the primary virtual assistant 104. In other examples, either primary virtual assistant 104 or local virtual assistant 102 converts a textual response to voice and/or renders the response in a display for the user. Examples of potential responses are provided below in conjunction with the discussion of FIG. 7.

Figure 3:
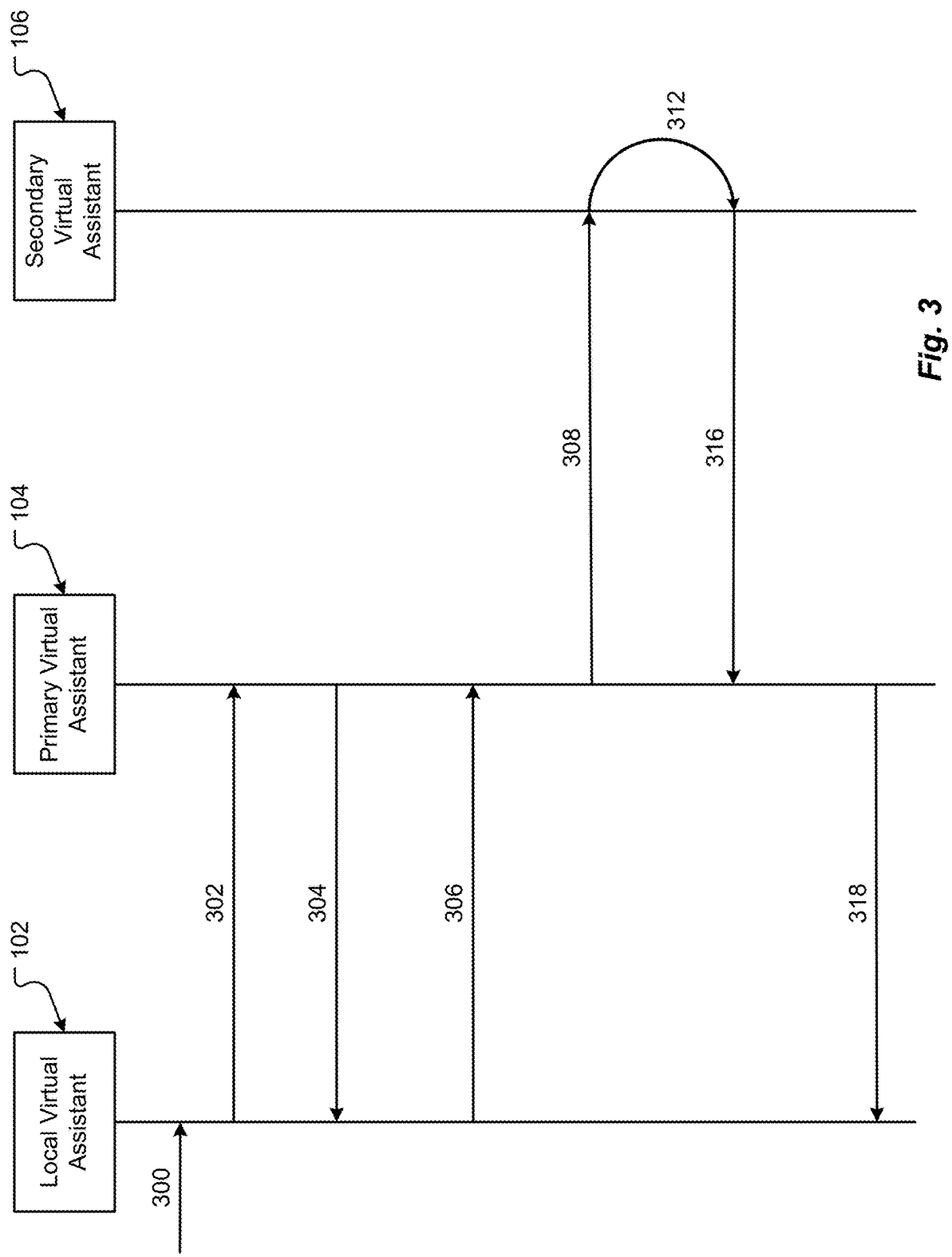
FIG. 3 illustrates a signaling diagram of signals sent between virtual assistants in accordance with aspects of the present disclosure.

An example of a signaling process for some embodiments discussed herein is shown in FIG. 3. That is, FIG. 3 displays the exemplary flow of information between the virtual assistants 102, 104 and 106. One or more signals communicated between the virtual assistants may contain data or other information, such as the data structures described in conjunction with FIGS. 4A-4F. First, in the example depicted in FIG. 3, the local virtual assistant 102 receives a wake word or wake signal 300 from the user. In some aspects, the wake word or signal may then be included in a signal 302 sent from the local virtual assistant 102 to the primary virtual assistant 104. In other aspects, the signal 302 indicates that the user wishes to engage with a virtual assistant, but need not explicitly include the wake word. An example of the data included in the signal 302 is shown and described below with respect to FIG. 4A, and includes, but is not limited to, the wake word, user identification information and a user provided command.

The primary virtual assistant 104 can then send a reply signal 304 to the local virtual assistant 102. The reply signal 304 can include different replies, for example, it may indicate that the local device is available to receive a user question or command. Alternatively or additionally, the reply signal 304 may cause the local device to stop playing music and/or reduce other noise generating activities to allow for a user question or command to be received. The cessation of activities by the local virtual assistant 102 on the local device can indicate to the user that the virtual assistant is available to receive a command or request; other indications that the local virtual assistant 102 is ready to receive a command are also possible. In other configurations, the signal 304 may include, for example, an audible signal (such as a tone or other sound), a visual signal (such as a lighting color and/or pattern of pulses), or other suitable signal that indicates that the local virtual assistant is available to receive the user's question or command.

The user may then issue a question or command, which is transmitted in signal 306 to the primary virtual assistant 104. The command may be issued by the user in a variety of ways, including for example, through voice or text. This command can be an invocation of a secondary virtual assistant, e.g., secondary virtual assistant 106 shown and described in conjunction with FIGS. 1 and 2. The signal 306 can include the data as shown in FIG. 4B. The invocation signal 306 may then be relayed, as signal 308, from the primary virtual assistant 104 to the secondary virtual assistant 106. The data in signal 308 may be as shown in FIG. 4C. Although shown as repeated in FIG. 4C, the data in signal 308 may include more or less data than that shown in FIG. 4B. Those skilled in the art will appreciate that header information and other information may be added or removed from the data structure before forwarding to the secondary virtual assistant 106.

The secondary virtual assistant 106 may then, upon receiving the signal 308, parse the data to determine the user, e.g., from the user identification data 404 (shown in FIG. 4C). Next, the secondary virtual assistant 106 may use the user identification information to extract the secondary (e.g., user-specific) information as represented by the signal arrow 312. The secondary virtual assistant 106 can then compose the secondary (e.g., user-specific) information into a response (e.g., a personalized update), which may have data as representatively shown and described in conjunction with FIG. 4D. The response can be a digitized response that can be incorporated into signal 316 and sent from the secondary virtual assistant 106 to the primary virtual assistant 104. The primary virtual assistant 104 may then incorporate the secondary (e.g., user specific) information into a response signal 320, which is sent from the primary virtual assistant 104 to the local virtual assistant 102. The local virtual assistant 102 then provides or plays the response to the user.

As will be appreciated, other signaling processes may occur in other embodiments. For instance, the signals 304 and 306 may be eliminated in some embodiments where the user combines a wake word with a request to invoke a secondary virtual assistant. In such a case, there may be no need for primary virtual assistant 104 to request a command from the user. Instead, primary virtual assistant 104 simply wakes and/or constructs an appropriate request to invoke the secondary virtual assistant 106 and delivers the same, e.g., signal 308. In other embodiments, other signals may be required, e.g., the secondary virtual assistant may request more information from the primary virtual assistant or the user before accessing user-specific information. In some embodiments, for example, it is contemplated that the secondary virtual assistant 106 requires authentication or other user preference information from the primary virtual assistant 104 before constructing a response signal 316. In such an example, there may be additional signals sent between the virtual assistants before the final signal 316 is sent. Those skilled in the art will recognize that other examples exist as well.

Configurations of data and data structures that can be stored, retrieved, managed, etc. by the system 100 may be as shown representatively in FIGS. 4A-4F. The data structures may be part of any type of data store, database, file system, memory, etc. including object oriented databases, flat file databases, etc. The data structures may also be part of some other memory configuration. The data structures can have more or fewer portions or fields than those shown in FIGS. 4A-4F.

The data structure shown in FIG. 4A is intended to show information that may be provided to the primary virtual assistant 104 from the local virtual assistant 102 when the user issues a wake word and optional command. The data structure can include user identification data 404, a wake word/signal 402, and/or a command 403. The user identification 404 can comprise an IP address, a user voiceprint, a username, a user password, other biometric information, etc.

In some configurations, the user identification information 404 may be provided by the user. For example, the user may have entered a username and/or password, scanned in or provided biometric data (e.g., recorded a voiceprint, a retinal scan), or given other information known to the user. This user-provided information may be stored by the local virtual assistant 102. Additionally or alternatively, the local virtual assistant 102 can extract user-associated information from communications, signals, etc. exchanged with the user or on behalf of the user. The user-associated information may be provided in metadata, in signal headers, etc. For example, the local virtual assistant 102 can store the IP address, phone number, email address, etc. of a user based on that information being present in communications with the virtual local assistant 102. Any of this user identification data 404 can be stored or incorporated, by the local virtual assistant 102, into the data structures 400 of FIG. 4A for later delivery to the primary virtual assistant 104.

The signal 402 (e.g., wake word) can be the designated voice or other signal for the user to engage the virtual assistant 104 and/or local virtual assistant 102. The wake word/signal 402 may be specific to the primary virtual assistant 104, for example, "Alexa" is the wake word for the Amazon Alexa virtual assistant. The wake word/signal 402 may be the recorded version of the wake word or a digitized version provided from a voice-to-text converter at the local virtual assistant 102. Other wake signals are possible.

The command 403 can be any type of request or command that may be interpreted by the primary virtual assistant 104 to provide a service or information to the user. For example, in some circumstances, the command 403 could be a request to play music. In the configurations herein, the command 403 may include the invocation of a secondary virtual assistant 106, for example, a signal to engage a secondary virtual assistant. The command 403 may be the recording of a voice command or a textual command provided from a voice-to-text converter at the local virtual assistant 102. Command 403 may be provided as a separate signal in at least some configurations and not be included with the data in FIG. 4A. The command 403 can be used as or translated into the invocation 406 of the secondary virtual assistant 106 in subsequent messages, as shown in FIG. 4C.

The data structure shown in FIG. 4B is intended to show information that may be provided to the primary virtual assistant 104 from the local virtual assistant 102 when user invokes the secondary virtual assistant 106. In the illustrated embodiment, the data structure provides user identification information 404 and an invocation 406. The user identification 404 is similar to that shown and described with respect to FIG. 4A. In some embodiments, the invocation 406 may be the same or similar to the command 403. In other embodiments, the invocation 406 may be an instruction formulated based on the command 403, such as a machine-readable instruction that indicates than an update should be provided. Examples of the invocation 406 are provided below.

The data structure shown in FIG. 4C is intended to show information that may be provided to the secondary virtual assistant 106 from the primary virtual assistant 104 when user invokes the secondary virtual assistant 106, as described above with respect to signal 308 in FIG. 3. The data structure is similar to the data structure shown in FIG. 4B, and is provided again to highlight embodiments in which the primary virtual assistant 104 creates and delivers an invocation to the secondary virtual assistant 106. In an example, the data structure provides user identification information 404 and an invocation 406. The user identification 404 is similar to that shown and described with respect to FIGS. 4A and 4B and provides information for the secondary virtual assistant to identify the user. The invocation 406 may be the same or similar to the command 403 or an instruction formulated based on the command, as described above.

The response 408 provided by the secondary virtual assistant 106 comprises the secondary (e.g., user-specific) information retrieved from the data stores 110 and/or 112, which can include one or more of, but is not limited to, the data provided in FIG. 4E. The response 408 can be a synthesized voice response or text that may be used by the primary virtual assistant 104 to generate a response to the user. Examples of the response 408 are discussed below.

The data represented in FIG. 4E may comprise user-specific data as stored in data stores 110 and/or 112. The data can include one or more of, but is not limited to, calendar information 410, email information 412, weather information 414, sports information 416, etc. The calendar information 410 can be any user-specific information that is associated with a calendar or time. For example, the calendar 410 information may include a meeting or a task to be completed by the user at an associated time. The calendar information 410 can include, for example, the name of the event or task, the date to be completed, the names of people associated with a meeting or event, etc.

Email 412 relates to any exemplary user-specific information that may be associated with a message, such as email, text, voicemail, or other message associated with the user. For example, the email information 412 may be a message that has been recently received. The email information 412 can include one or more of, but is not limited to, the name or the title of the message, the date and/or time the message was received, the names of people associated with the message, the content of the message, etc.

Weather information 414 can include the present or future weather conditions for a location associated with the user. For example, the weather information 414 can include one or more of, but is not limited to, the current temperature, current or future weather advisories or warnings, current or future weather conditions (e.g., rain, snow), etc. As may be appreciated, the secondary virtual assistant may determine different weather information to be important to the user based on information not known to the primary virtual assistant. For example, the secondary virtual assistant may know, based on calendar information, the user is traveling and thus may provide weather information based on the user's upcoming location.

Similarly, sports information 416 can include any past, current, or future sports information that may be of interest to the user. For example, the sports information 416 can include one or more of, but is not limited to, the scores of past games of the user's favorite or liked sports teams or personalities, the times of future sporting events, the odds or other analysis of future or past sporting events, commentary or description of past or future sporting events, play-by-play of current sporting events, etc. The data in FIG. 4E can include more or less user-specific information than that illustrated, as represented by the ellipses 418. Any portion of the information, in the data shown in FIG. 4E, can be included in the response 408.

Further, the information shown in FIG. 4E can be generated or determined from analysis of the user's contextual information 112, such as the user's historical behavior. In other words, the user's interactions with the secondary virtual assistant 106 or other activities, for example, searches on the Internet, music listened to, television or movies viewed, items purchased, etc. may be reviewed and analyzed. The analysis may be used to identify characteristics associated with the user. These characteristics may also be used to generate data in FIG. 4E. For example, information about a sale of a user's favorite product may be included in the data in FIG. 4E. Thus, the response 408 can proactively include relevant data that can enhance a user's experience.

Figure 5:
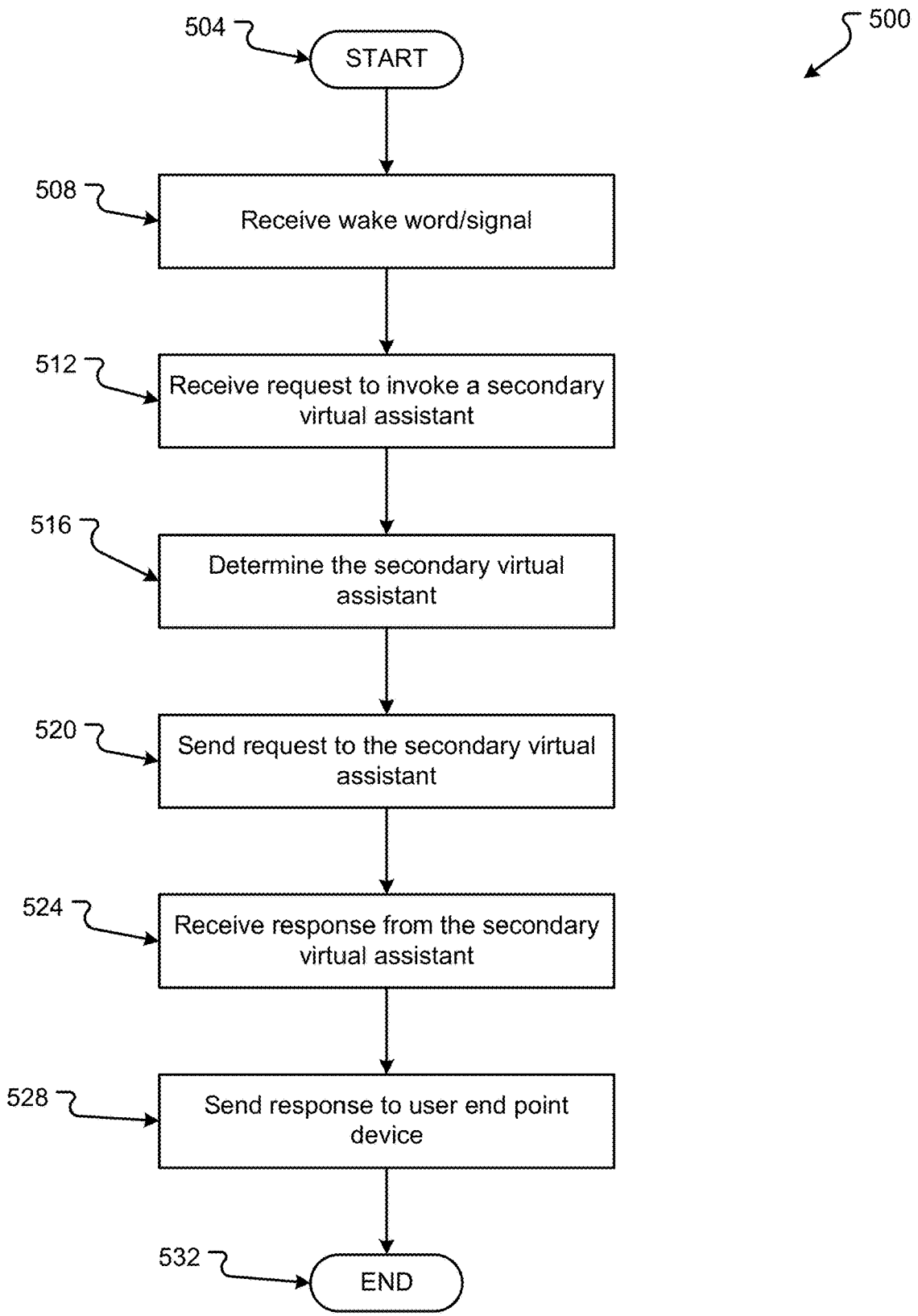
FIG. 5 illustrates a method, conducted by a primary virtual assistant, for providing secondary information in response to an invocation of a secondary virtual assistant in accordance with aspects of the present disclosure.

A method 500 conducted by the primary virtual assistant 104 for providing secondary (e.g., user-specific) information in response to an invocation of a secondary virtual assistant 106 may be as shown in FIG. 5. A general order for the steps of the method 500 is shown in FIG. 5. The method 500 can include more or fewer steps or can arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an application specific integrated circuit (ASIC), a field programmable gate array (FPGA), a system-on-chip (SOC), or other hardware device. Hereinafter, the method 500 shall be explained with reference to the systems, components, devices, modules, software, data structures, user interfaces, methods, etc. described in conjunction with FIGS. 1-4F and 6-13.

The primary virtual assistant 104 may receive the spoken wake word or another wake signal, such as wake signal 402, from the local virtual assistant 102, in step 508. The wake word/signal may require the local virtual assistant 102 to discontinue or mute any currently executing activity. In an embodiment, the wake word/signal is designed to indicate that the user intends to engage the primary virtual assistant 104 or the local virtual assistant 102.

The primary virtual assistant 104 may then receive, from the local virtual assistant 102, a request, such as command 403, to invoke a secondary virtual assistant 106, in step 512. The secondary virtual assistant (or other third-party service) may reside on a separate server, or it may reside on the same server as the primary virtual assistant 104. The primary virtual assistant 104 determines which secondary virtual assistant to which the invocation is associated, in step 516. In some embodiments, the invocation includes information about the third party service, for example, the name of the secondary virtual assistant 106.

In other embodiments, the primary virtual assistant 104 may store an association between the user and one or more secondary virtual assistants 106 used by the user. For example, the primary virtual assistant 104 may store a data structure where user identification information is stored with the name or identification information for one or more secondary virtual assistants 106. Thus, when the primary virtual assistant 104 receives an invocation, the identity of an appropriate secondary virtual assistant 106 can be located in the data structure. The association can be generated by information provided by a user via an application, user interface, etc. In other embodiments, the primary virtual assistant 104 can learn the identity of the secondary virtual assistant 106 from invocations received from the user or a group of users, or in another suitable manner.

Upon the determination of the secondary virtual assistant 106, the primary virtual assistant 104 sends the request for invocation or other command or request to the secondary virtual assistant, in step 520. Thereinafter, the primary virtual assistant 104 can receive a response from the secondary virtual assistant. The response, such as response 408, may be transformed into a voice response, if required. This response may then be sent from the primary virtual assistant 104 to the local virtual assistant 102, in step 528.

Figure 6:
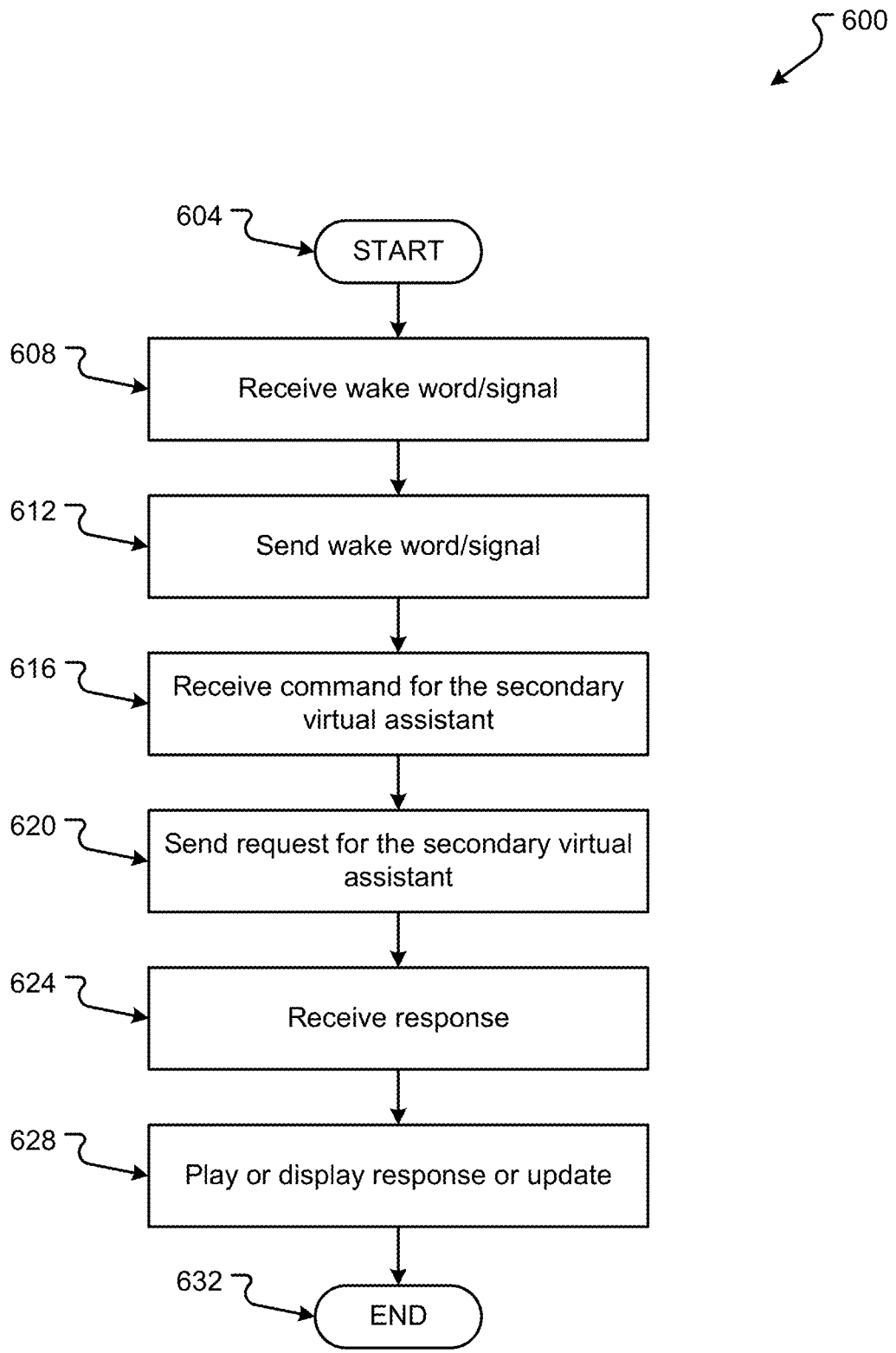
FIG. 6 illustrates a method, conducted by a local virtual assistant, for providing secondary information in response to an invocation of a secondary virtual assistant in accordance with aspects of the present disclosure.

A method 600 conducted by the local virtual assistant 102 for providing secondary (e.g., user-specific) information in response to an invocation of a secondary virtual assistant 106 may be as shown in FIG. 6. A general order for the steps of the method 600 is shown in FIG. 6. The method 600 can include more or fewer steps or can arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, a FPGA, a SOC, or other hardware device. Hereinafter, the method 600 shall be explained with reference to the systems, components, devices, modules, software, data structures, user interfaces, methods, etc. described in conjunction with FIGS. 1-5 and 7-13.

The local virtual assistant 102 may receive a spoken wake word or other signal 402 from the user, in step 608. The wake word or signal 402 is sent to the primary virtual assistant 104 from the local virtual assistant 102, in step 612. In some embodiments (not shown), the local virtual assistant 102 then receives a signal from the primary virtual assistant 104 to discontinue or mute any currently executing activity, which can be completed by the local virtual assistant 102.

The local virtual assistant 102 may then receive, via a voice or other command from a user, a request for a service that may be provided by a secondary virtual assistant 106, in step 616. The command may comprise an invocation 406, which may in turn be sent to the primary virtual assistant 104, in step 620.

Thereinafter, the local virtual assistant 102 can receive from the primary virtual assistant 104 a signal, which may include a response (e.g., a user-specific response or update), such as response 408, in step 624. The response may be transformed into a voice response if required. This response may then be played, displayed or otherwise provided, by the local virtual assistant 102, in step 628.

Figure 7:
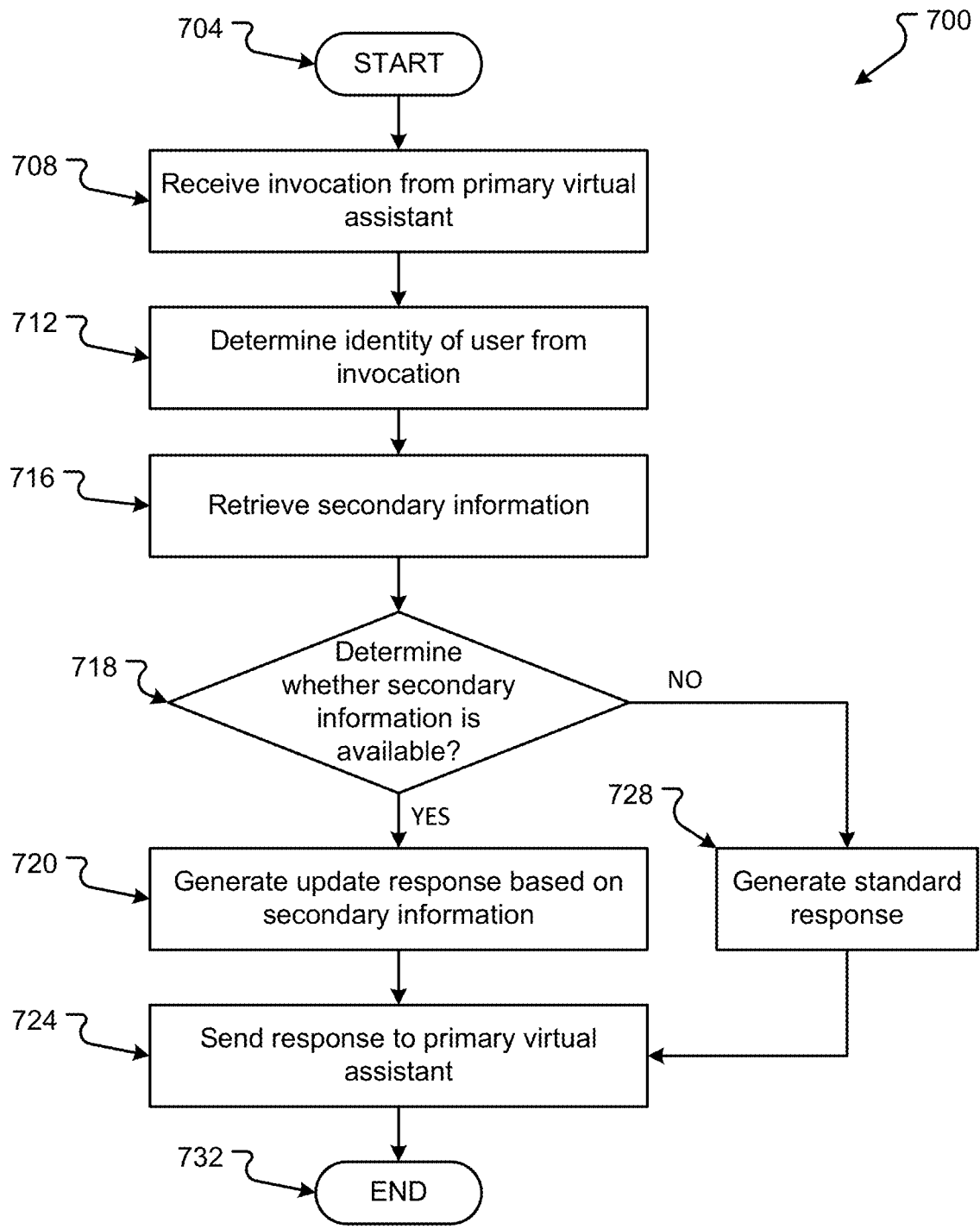
FIG. 7 illustrates a method, conducted by a secondary virtual assistant, for providing secondary information in response to an invocation of a secondary virtual assistant in accordance with aspects of the present disclosure.

A method 700 conducted by the secondary virtual assistant 106 for providing user-specific information in response to an invocation of the secondary virtual assistant 106 may be as shown in FIG. 7. A general order for the steps of the method 700 is shown in FIG. 7. The method 700 can include more or fewer steps or can arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, a FPGA, a SOC, or other hardware device. Hereinafter, the method 700 shall be explained with reference to the systems, components, devices, modules, software, data structures, user interfaces, methods, etc. described in conjunction with FIGS. 1-6 and 8-13.

The secondary virtual assistant 106 may receive an invocation from the primary virtual assistant 104, in step 708. The invocation signal can include the user identification information 404, as shown in FIG. 4C. From the user identification information, the secondary virtual assistant 106 determines the identity of the user, in step 712. In some configurations, the secondary virtual assistant 106 matches the user identification information with information in a database, such as data stores 110 and/or 112 (or others, not shown), to identify the requesting user. For example, the secondary virtual assistant 106 may locate an IP address of the local virtual assistant 102 to identify a user associated with the local virtual assistant 102. From the user's identity, the secondary virtual assistant 106 can search for and retrieve secondary (e.g., user-specific) information, such as information 410-416, from the data stores(s) 110 and 112, in step 716.

The secondary virtual assistant 106 may then determine if the search located any appropriate secondary information in the one or more data stores, in step 718. Information may be deemed relevant if it is within temporal proximity to the current time or is otherwise important. If there is appropriate data located by the search and available to provide, the method 700 proceeds YES to step 720. However, if no appropriate data is located or available, the method 700 proceeds NO to step 728, where the secondary virtual assistant can generate a standard response. For example, the standard response can be an indication that the secondary virtual assistant 106 is available receive a command, e.g., "How can I help?"

From the data extracted from the data stores 110, 112, the secondary virtual assistant 106 can generate a response, such as response 408, in step 720. Generating the response may include manipulation of the data extracted from the data stores 110 and 112, including filtering some of the data to create a subset of data, ranking elements of the data, changing the format of some of the data, etc. The response may be a synthesized voice response, a text output, or other output that can be formed into a response by the primary virtual assistant 104 and/or the local virtual assistant 102. The generated response may then be sent to the primary virtual assistant 104 in response to the invocation, in step 724.

In some embodiments, the response comprises a personalized update including user-specific information. Examples of logic for manipulation of user-specific information (e.g., email or calendar information) and formation of an update response from that information are set forth below.

For example, if the user has an only an email update (e.g., the user has received new email recently), the secondary virtual assistant provides the user with a response indicating information about the email or an indication that new email has arrived. If, alternatively, the user has only calendar updates (e.g., an upcoming meeting), the secondary virtual assistant provides a response including the calendar information. If, alternatively, the user has both email and calendar updates, the calendar update may be presented with a hint of more updates being available, e.g., a general indication can be provided stating that there are newly received emails or other updates (e.g., a new event in another application), without providing detailed information.

As an example, if the user has email and other updates, the email update may be presented with a hint of more updates. In a further example, if the user has calendar and other updates, the calendar update may be presented with a hint of more updates. In still another example, if a user has email updates, calendar updates, and other updates, the secondary virtual assistant 106 can share one or more of the email or calendar updates and a tip that there are other updates available. If a user asks to hear the other updates, the secondary virtual assistant 106 can give the detailed information associated with the other updates.

If the user does not have email or a calendar connected, the secondary virtual assistant 106 may generate a more generic greeting, such as "how can I help?" In such cases, particularly if it is the user's first time invoking the secondary virtual assistant 106, the secondary virtual assistant 106 can add a tip (e.g., at the end of the greeting or response) indicating that if the user connects his account(s), he can receive personalized updates.

The type of response information may vary based on a period of time since a previous invocation request. In some embodiments, the secondary virtual assistant 106 and/or primary virtual assistant 104 may determine if the period of time since a last invocation is under a predetermined benchmark. For example, if a user invoked the secondary virtual assistant 106 less than 5 minutes ago and got a detailed response, the secondary virtual assistant 106 may not provide a response or the same response. Instead, the secondary virtual assistant 106 may provide a shorter response, provide a different response, or ask the user if he/she wants to have the previous response again. In contrast, if the period of time is over the predetermined benchmark, e.g., the last invocation was over 2 hours ago, the user's memory may be refreshed by providing the same detailed response again, even if no new information is available.

As discussed in more detail above, certain embodiments may involve primary and secondary virtual assistants such as Amazon's Alexa and/or Microsoft's Cortana. For instance, a user may use Alexa as a primary virtual assistant and request it to invoke Cortana® to access the user's calendar or other account information. Cortana may provide, in response to being invoked, a summary of important user-specific information based on the time of day, e.g., a reminder of an upcoming meeting or an indication that the user just received an important email item. The response may be provided to the user through the Alexa® interface. Despite this specific example, one of skill in the art will appreciate that the aspects disclosed herein can be applied to other services, other virtual assistants, and/or other applications.

For example, when invoking Cortana for the first time, the user may be given a quick introduction of the capabilities that may be provided, with which the user may be otherwise unfamiliar. For example, the user says "Alexa, I want to chat with Cortana." The secondary virtual assistant 106 responds, "Cortana here, I can check your calendar, email, lists, and more. How can I help you?" With subsequent experiences, the user may ask "Alexa, open Cortana." The secondary virtual assistant 106 responds, if no updates are available, "Hi Nico. How can I help?" If only an email update is available, the secondary virtual assistant 106 responds, "Hi Nico, you have a new email from AJ. How can I help?" The user may then respond, "Read it to me," to which the secondary virtual assistant 106 responds, "You got an email from AJ about an hour ago about 'Coral Reef Damage Review.' It says, 'I hope you can meet on Thursday . . . '" Then, the user may ask, "Do I have any other new emails?," to which the secondary virtual assistant 106 may state, "You got 7 new emails in the last hour. First . . . "

Similarly, if only a calendar event is available, the secondary virtual assistant 106 may respond, "Hi Nico, coming up next at 9 am, you've got Design Review in Building 86. How can I help?" If both an email event and other updates are available, the secondary virtual assistant 106 may respond, "Hi Nico, you've got new email from AJ and other updates. Now, how can I help?" If both a calendar event and other updates are available, the secondary virtual assistant 106 may respond, "Hi there Nico, coming up next at 9:30, you have Budget Review in Building 86, and I've got other updates for you. How can I help?" Then, if the user responds, "What are my (other) updates?" The secondary virtual assistant 106 may respond, "You got 10 new emails in the last hour, including one from Nico just to you. Also, don't forget to pick up the birthday cake on your way home from work. By the way, you can customize your updates in the Cortana app. I've sent a link to your phone with the details." After the secondary virtual assistant 106 shares the updates, the secondary virtual assistant may enter a dialog continuation loop in which the user can ask questions or issue commands about the information shared or other topics and the assistant can respond. For example, the user can say, "Read that email," "What are the rest of those updates?," "Move that meeting," etc.

Figure 8:
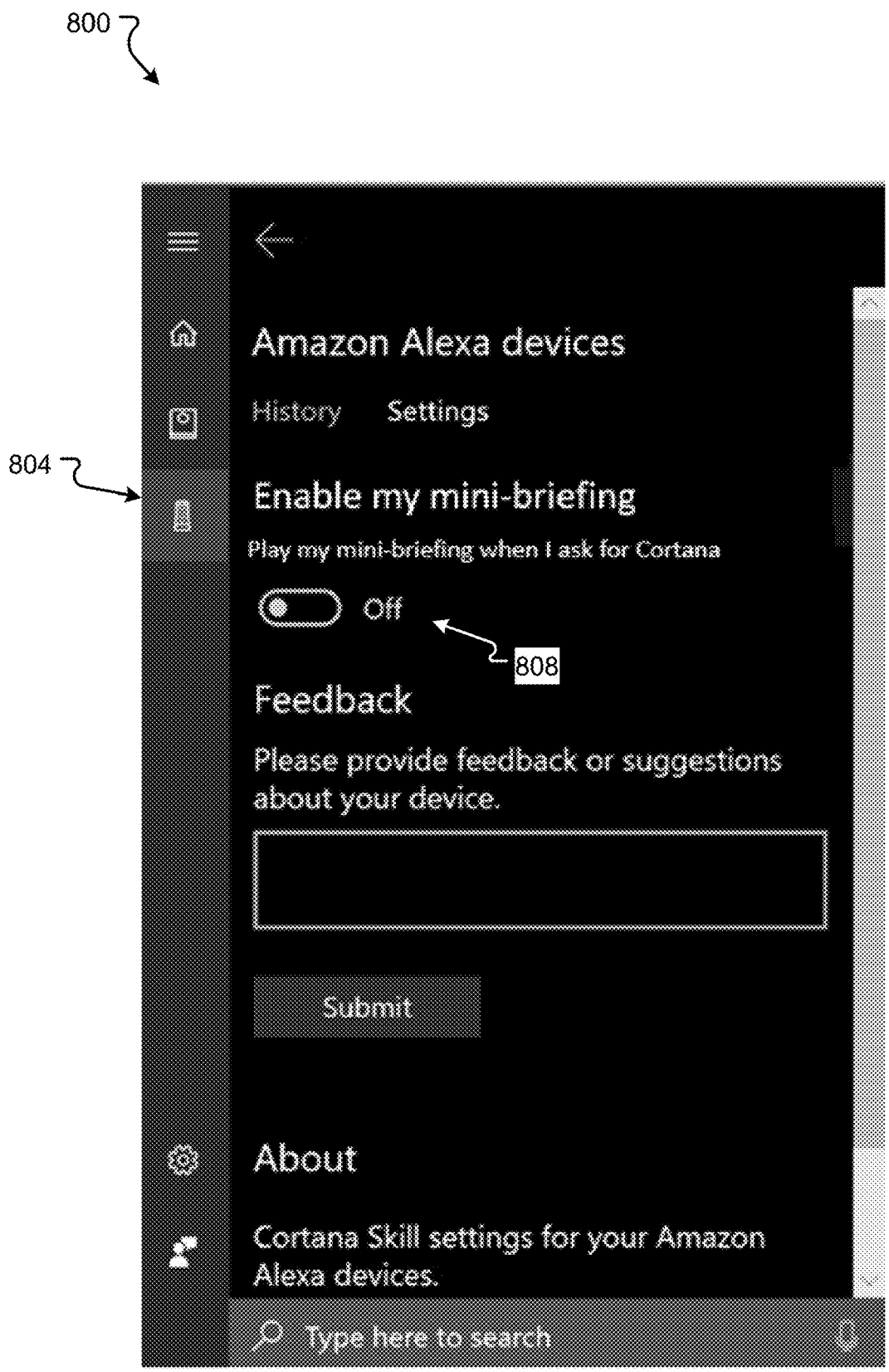
FIG. 8 illustrates a user interface for establishing settings for a secondary virtual assistant in accordance with aspects of the present disclosure.

Configuration of a user interface 800 for enabling updates from a secondary virtual assistant 106 through an exemplary primary virtual assistant 104 may be as shown in FIG. 8. The user interface 800 may be provided in response to selecting a settings menu 804 for a virtual assistant device. The settings include an option to enable responses (e.g., personalized updates) from a secondary virtual assistant. For example, the option may read, "Enable my mini-briefing," and be associated with a user interface element 808, which may be a toggle switch or other element, which can turn on or off the updates based on the user's selected preference. In this example, the "mini-briefing" may indicate or trigger the secondary virtual assistant to provide updates, containing user-specific information within data stores accessible by the secondary virtual assistant, when receiving an invocation, as described above.

Figure 9:
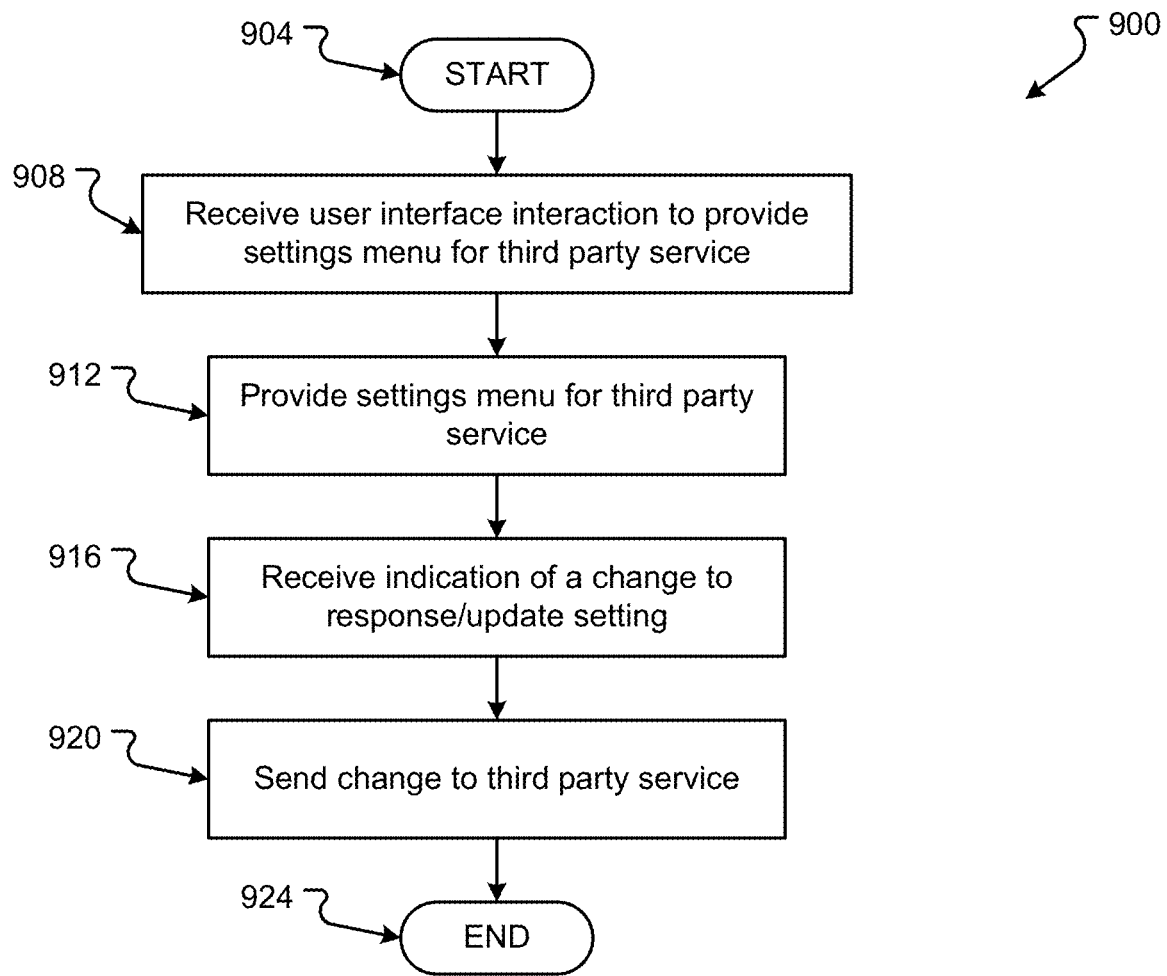
FIG. 9 illustrates a method, conducted by a primary virtual assistant, for establishing settings associated with an invocation of a secondary virtual assistant in accordance with aspects of the present disclosure.

A related method 900 for enabling responses (e.g., updates) from a secondary virtual assistant may be as shown in FIG. 9. A general order for the steps of the method 900 is shown in FIG. 9. The method 900 can include more or fewer steps or can arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, a FPGA, a SOC, or other hardware device. Hereinafter, the method 900 shall be explained with reference to the systems, components, devices, modules, software, data structures, user interfaces, methods, etc. described in conjunction with FIGS. 1-8 and 10-13.

First, the local virtual assistant 102 may receive a user interface interaction to provide a user interface 800 for selecting settings for a third party service, for example, the secondary virtual assistant 106, in step 908. The local virtual assistant 102 may then provide the user interface 800, as shown in FIG. 8, in step 912. Thereinafter, the user interface 800 can receive an indication of a change to the update settings, in step 916. For example, the change may be a toggling of the switch 808 from on to off or off to on. Regardless of the type of change, the local virtual assistant 102 can send a change message to the third party service, for example, the secondary virtual assistant 106 and/or the primary virtual assistant 104, in step 920. The secondary virtual assistant 106 can then set the processing of the invocation requests, e.g., by setting a bit or indicator in a data object at the secondary virtual assistant 106, to either provide updates or not provide updates, as requested by the user.

Figure 10:
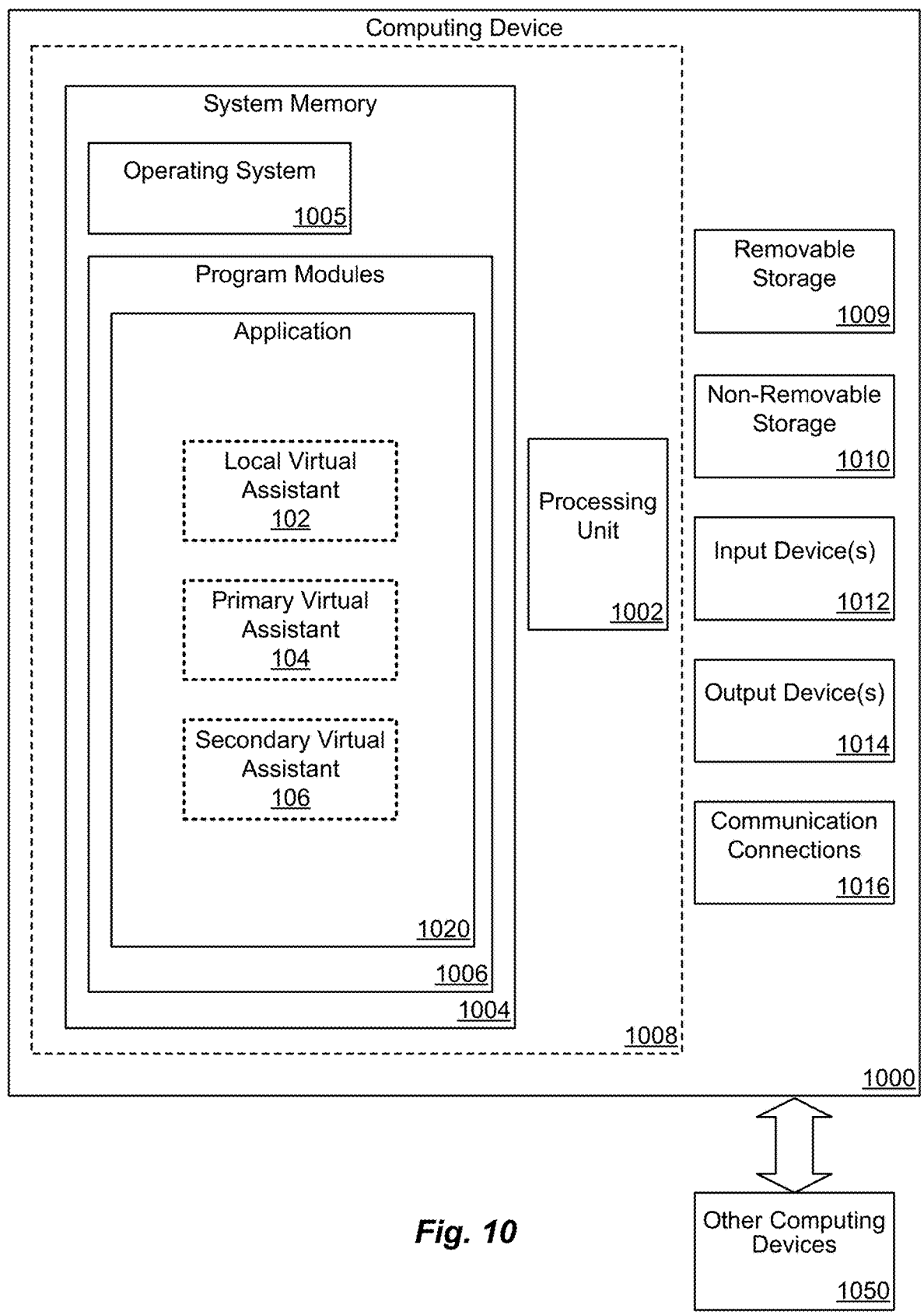
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above. For instance, as indicated by the dashed lines for 102, 104 and 106, each of these could be implemented on such a device 1000. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for performing the various aspects disclosed herein such as identity provider 1024 and attribute inference processor 1026. The operating system 1005, for example, may be suitable for controlling the operation of the computing device 1000. Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1080. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
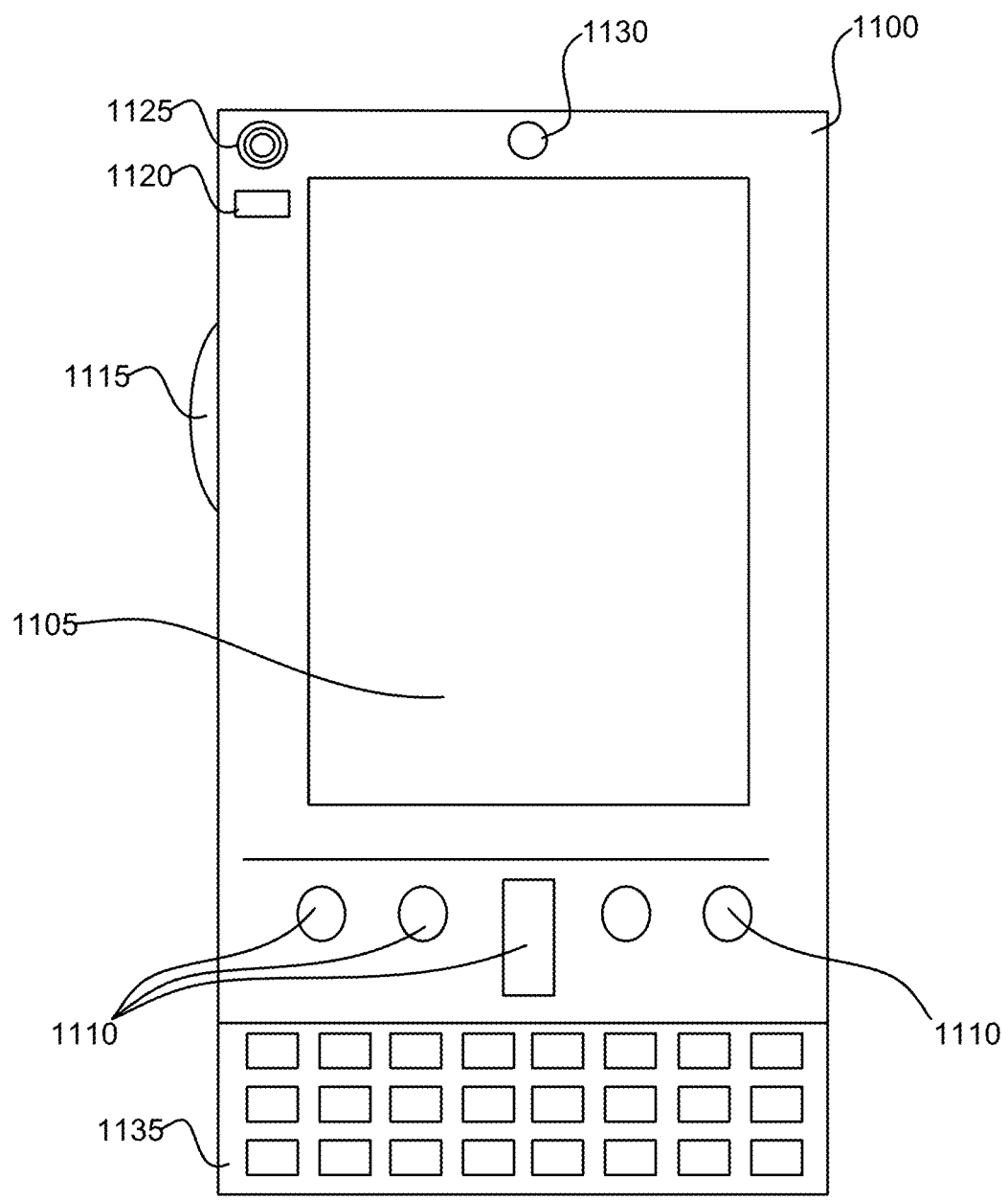
FIG. 11A is a simplified block diagram of a computing device with which aspects of the present disclosure may be practiced.
Figure 11B:
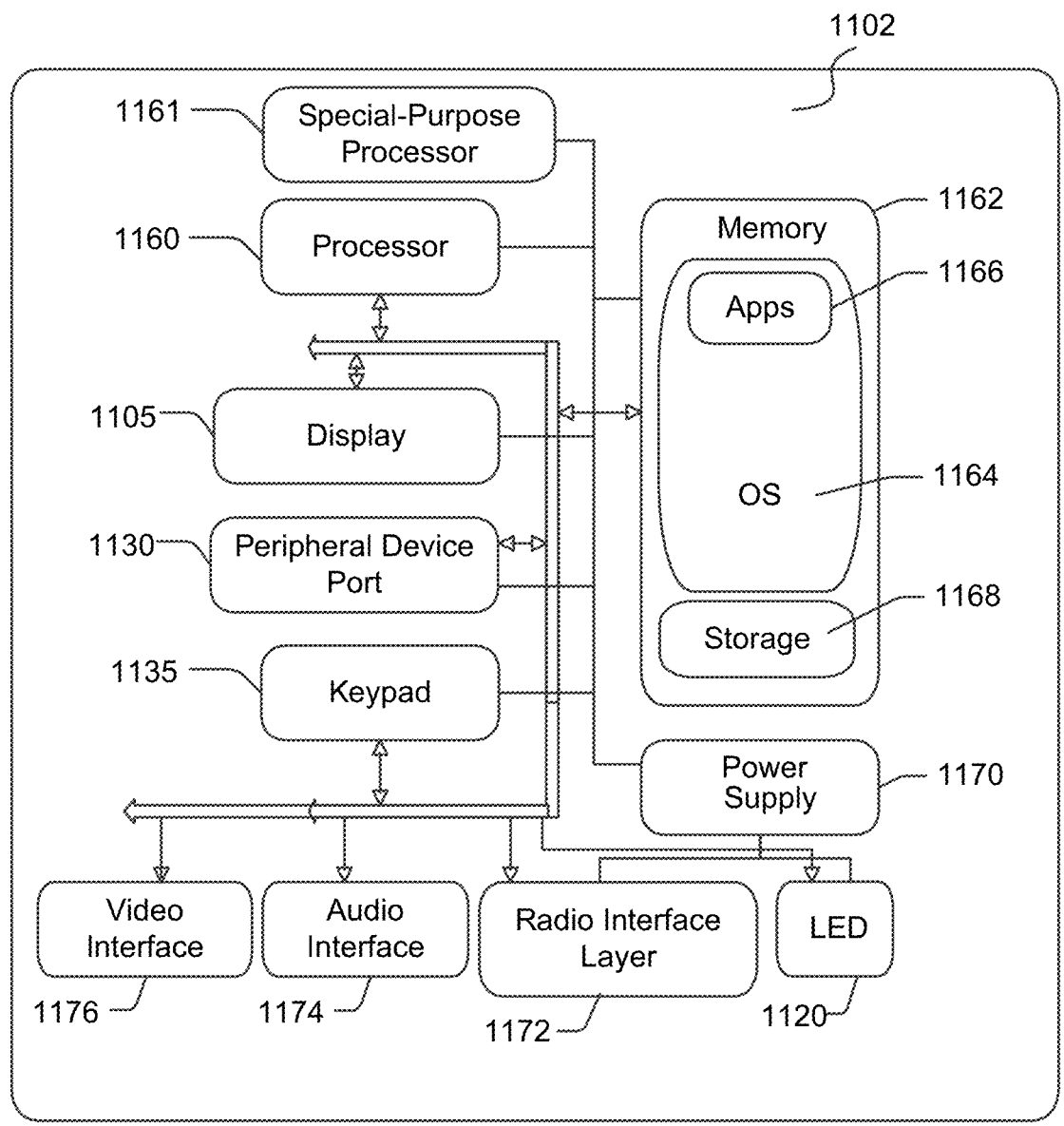
FIG. 11B is another are simplified block diagram of a mobile computing device with which aspects of the present disclosure may be practiced.

FIGS. 11A and 11B illustrate a computing device or mobile computing device 1100, for example, a mobile telephone, a smart phone, wearable computer (such as a smart watch), a tablet computer, a laptop computer, and the like, with which aspects of the disclosure may be practiced. In some aspects, the client (e.g., computing system 104) may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some aspects. In yet another alternative aspect, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various aspects, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of computing device, a server (e.g., server hosting secondary virtual assistant 106), or a mobile computing device. That is, the computing device 1100 can incorporate a system (e.g., an architecture) 1102 to implement some aspects. The system 1102 can implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated configuration, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
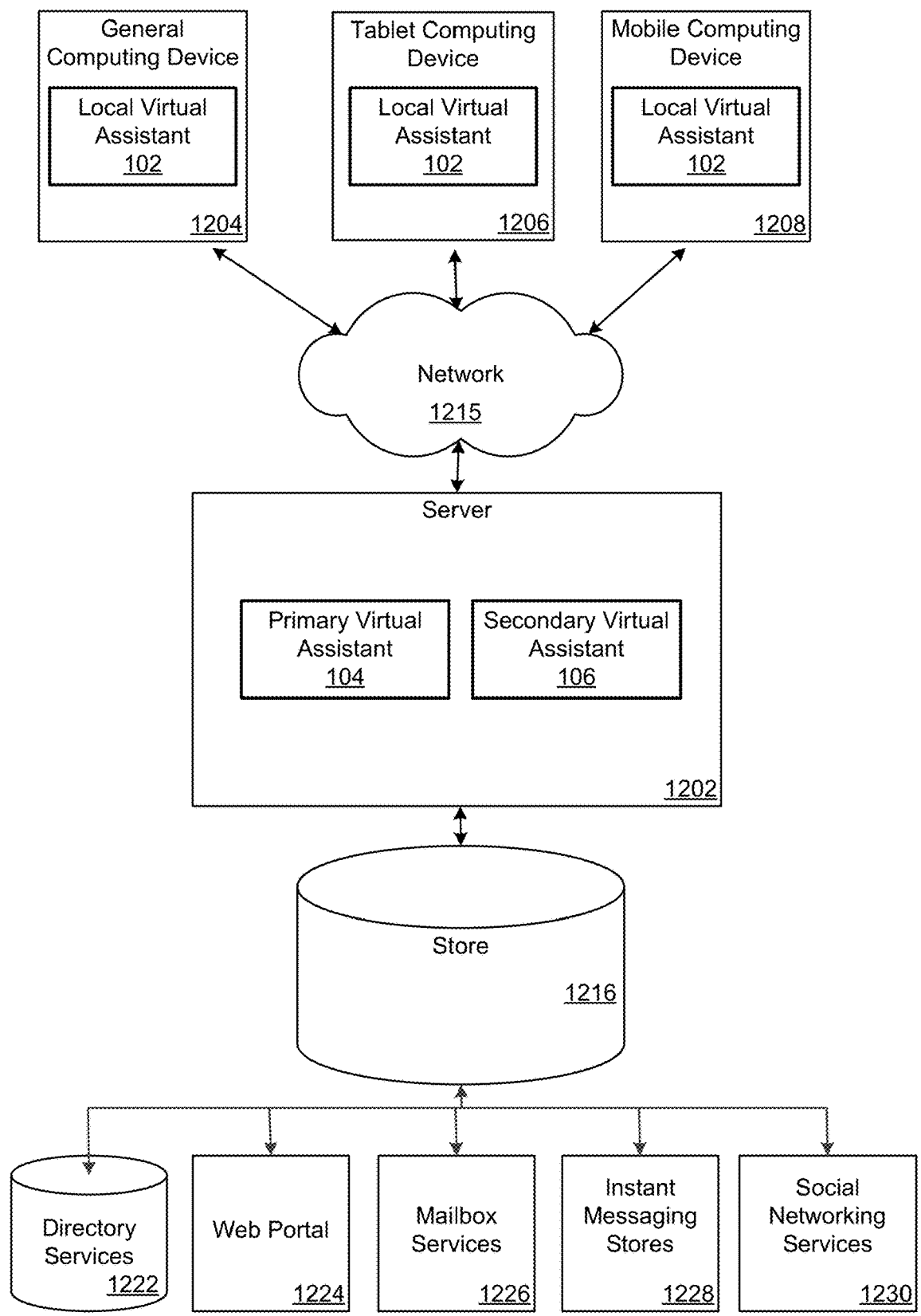
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. Unified profile API 1221 may be employed by a client that communicates with server device 1202, and/or attribute inference processor 1220 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these configurations of the computing devices may obtain content from the store 1216, in addition to receiving graphical data useable to be either pre-processed at a graphic-originating system, or post-processed at a receiving computing system.

Figure 13:
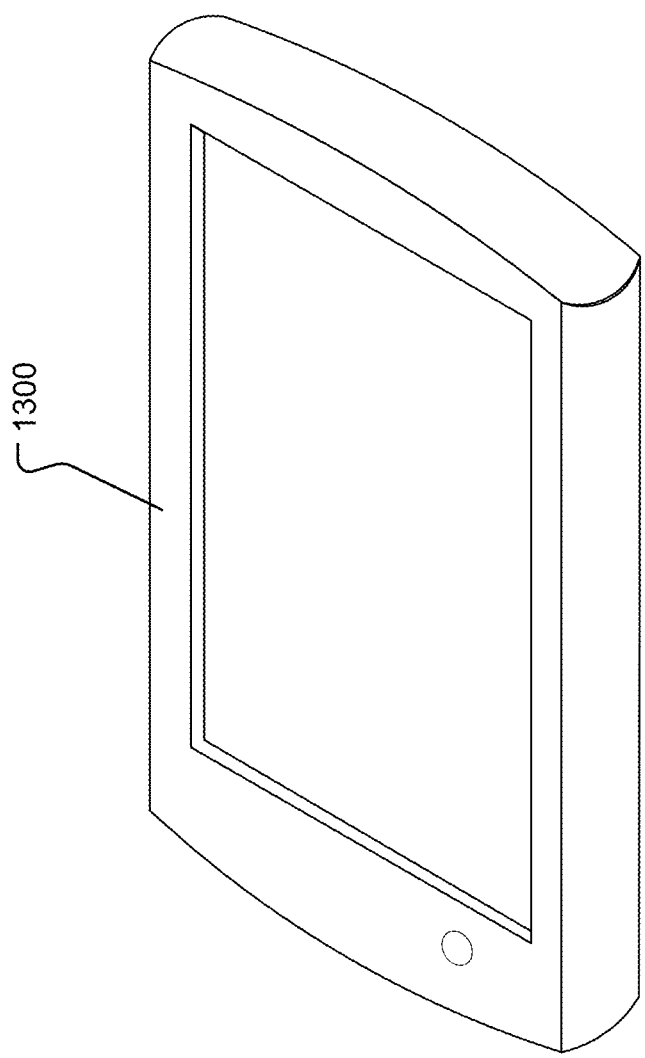
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure include a method comprising: receiving, from a primary virtual assistant or service, an invocation of a secondary virtual assistant or service; based on identification information in the invocation, identifying a user associated with the invocation; retrieving user-specific information associated with the user; and sending an update response including at least a portion of the retrieved user-specific information. Other aspects relate to the primary virtual assistant receiving the invocation from a local virtual assistant.

Other aspects of the disclosure relate to the identification information as being one or more of an IP address, an account information, speech recognition, biometric information, and/or user information. Yet other aspects the first virtual assistant passing the invocation from the local virtual assistant to the second virtual assistant. In embodiments, the primary virtual assistant does not have access to the user-specific information. In embodiments, at least some of the user-specific information comprises data associated with one of an email or a calendar. Further, the secondary virtual assistant is provided access to a user's email or calendar to retrieve the user-specific information.

Other aspects involve the user-specific information as being within temporal proximity to a current time when the invocation is received. In embodiments, the user enables the update response by selecting a user interface device in a settings menu associated with the first virtual assistant.

Aspects of the present disclosure also include a computer storage media having stored thereon computer-executable instructions that when executed by a processor cause the processor to perform a method, the method comprising: receiving, from a user at a local virtual assistant, an invocation of a second virtual assistant; sending a signal to a first virtual assistant with the invocation and an identification information, wherein based on identification information in the signal, the second virtual assistant can identify a user associated with the local virtual assistant, and wherein the second virtual assistant retrieves user-specific information associated with the user based on the identification information; receiving an update response to the invocation including at least a portion of the retrieved user-specific information; and playing the update response for the user. In some cases the identification information is one or more of an IP address, an account information, speech recognition, biometric information, and/or user information. Also, in some embodiments, the first virtual assistant does not have access to the user-specific information.

Aspects of the present disclosure further include a server, comprising: a memory storing computer executable instructions; a processor, in communication with the memory, wherein the processor reads the computer executable instructions from memory and when executing the computer executable instructions executes: a first virtual assistant, wherein the first virtual assistant: receives, from a local virtual assistant, an invocation of a second virtual assistant; based on the invocation, identifying a third party that executes the second virtual assistant; forwarding the invocation to the third party, wherein the invocation comprises identification information, which the second virtual assistant identifies a user associated with the invocation; receiving an update response to the invocation, wherein the update response includes user-specific information associated with the user, wherein the second virtual assistant retrieved the user-specific information based on the identification information; and sending the update response to the invocation, including at least a portion of the retrieved user-specific information, to the local virtual assistant.

What is claimed is:

1. A method comprising:
   receiving, from a primary virtual assistant, an invocation of a secondary virtual assistant, the primary virtual assistant having received the invocation of the secondary virtual assistant from a local virtual assistant;
   invoking the secondary virtual assistant;
   based on identification information in the invocation, identifying a user associated with the invocation;
   retrieving, from a data store accessible by the secondary virtual assistant but not the primary virtual assistant, secondary information associated with the user and accessible by the secondary virtual assistant, wherein the secondary information is not accessible by the primary virtual assistant, wherein the secondary information is information specific to the user; and
   sending a response including at least a portion of the retrieved secondary information from the secondary virtual assistant.

2. The method of claim 1, wherein the secondary virtual assistant executes a service to retrieve the secondary information.

3. The method of claim 2, wherein the identification information is one or more of an Internet Protocol (IP) address, an account information, speech recognition, biometric information, and/or user information.

4. The method of claim 3, wherein the primary virtual assistant passes the invocation from the local virtual assistant to the secondary virtual assistant.

5. The method of claim 4, wherein the primary virtual assistant and the local virtual assistant are associated.

6. The method of claim 5, wherein at least the portion of the secondary information comprises data associated with one of an email or a calendar that is specific to the user.

7. The method of claim 6, wherein the secondary information is user-specific contextual information.

8. The method of claim 7, wherein the user-specific contextual information is within temporal proximity to a current time when the invocation is received.

9. The method of claim 8, wherein the user enables the response.

10. The method of claim 9, wherein the user enables the response by selecting a user interface device in a settings menu associated with the local virtual assistant.

11. A computer storage media having stored thereon computer-executable instructions that when executed by a processor cause the processor to perform a method, the method comprising:
    receiving at a first virtual assistant, from a user communicating with a local virtual assistant, an invocation of a second virtual assistant;
    sending a signal to the second virtual assistant with the invocation and identification information of the user;
    receiving, from the second virtual assistant, a response to the invocation including secondary information, wherein the second virtual assistant executes a service to retrieve the secondary information and the secondary information is not accessible by the first virtual assistant; and
    providing the response for the user.

12. The computer storage media of claim 11, wherein the second virtual assistant retrieves the secondary information based on the identification information, and wherein the identification information is one or more of an Internet Protocol (IP) address, an account information, speech recognition, biometric information, and/or user information.

13. The computer storage media of claim 11, wherein the the service retrieves the secondary information from a data store.

14. The computer storage media of claim 11, wherein at least a portion of the secondary information comprises data associated with one of an email or a calendar.

15. The computer storage media of claim 11, wherein the secondary information is within temporal proximity to a current time when the invocation is received.

16. A server, comprising:
    a processor;
    a memory storing computer executable instructions, which when executed, cause the processor to:
      provide a first virtual assistant, wherein the first virtual assistant:
        receives, from a local virtual assistant, an invocation of a second virtual assistant from a user;
        based on the invocation, identifies a third party that executes the second virtual assistant;
        sends an indication of the invocation to the third party, wherein the invocation comprises identification information;
        receives a response to the indication of the invocation, wherein the response includes secondary information associated with the user, wherein the secondary information is retrieved by a skill accessed by the third party, and the skill provides, to the third party, the secondary information that is not accessible by the first virtual assistant; and
        sends, to the local virtual assistant, the response to the indication of the invocation that includes at least a portion of the secondary information.

17. The server of claim 16, wherein the identification information is one or more of an Internet Protocol (IP) address, an account information, speech recognition, biometric information, and/or user information.

18. The server of claim 16, wherein the third party is the second virtual assistant that executes the skill to retrieve the secondary information.

19. The server of claim 16, wherein at least a portion of the secondary information comprises data associated with one of an email or a calendar.

20. The server of claim 16, wherein the secondary information is within temporal proximity to a current time when the invocation is received.

* * * * *